Oct. 23, 1962
L. J. WUBBE
3,059,486
MOTION-TRANSMITTING DEVICE
Filed Aug. 25, 1960
3 Sheets-Sheet 1
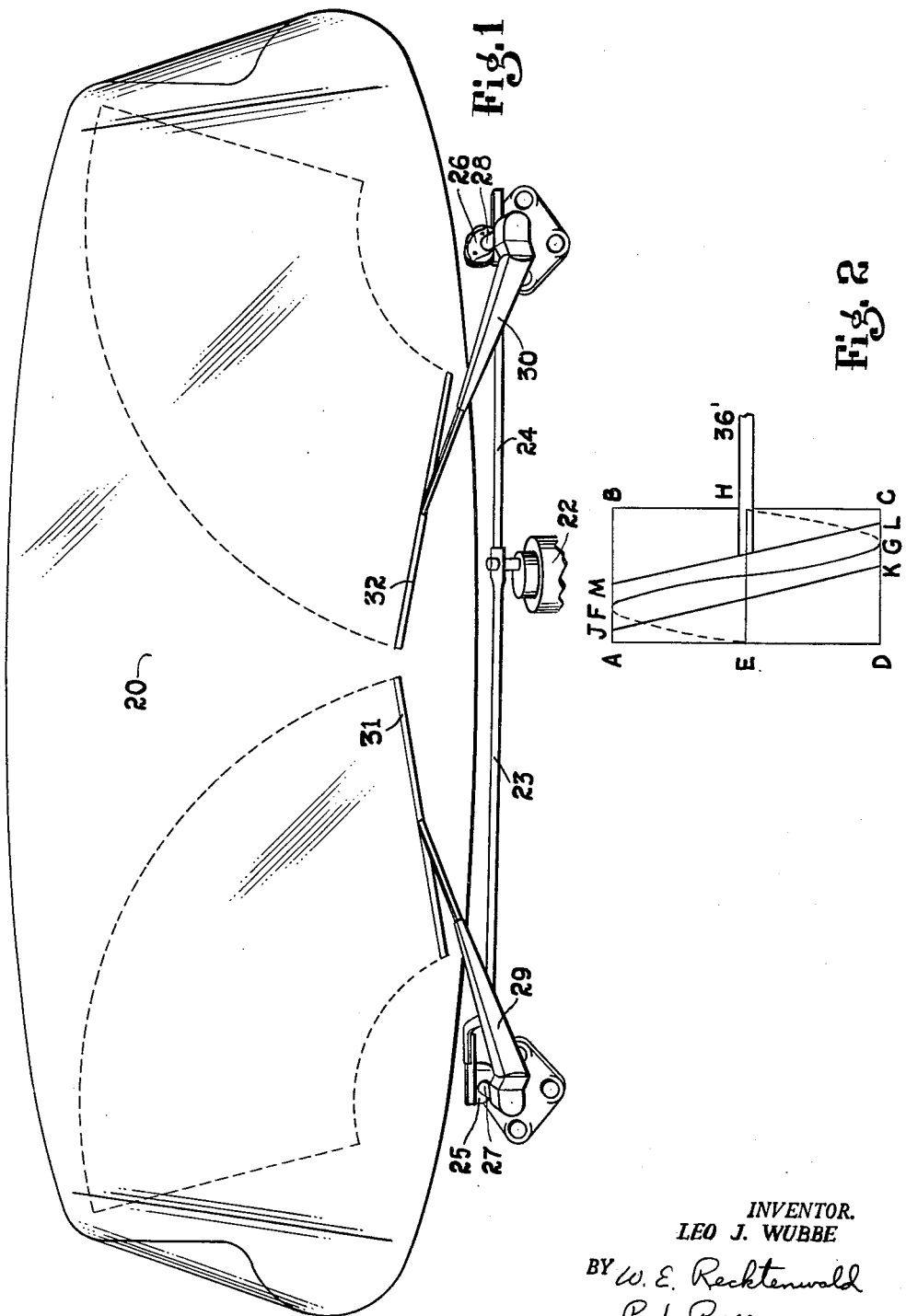
INVENTOR.
LEO J. WUBBE
BY W. E. Recktenwald
P. J. Rose
ATTORNEYS Oct. 23, 1962 L. J. WUBBE 3,059,486
MOTION-TRANSMITTING DEVICE
Filed Aug. 25, 1960 3 Sheets-Sheet 2
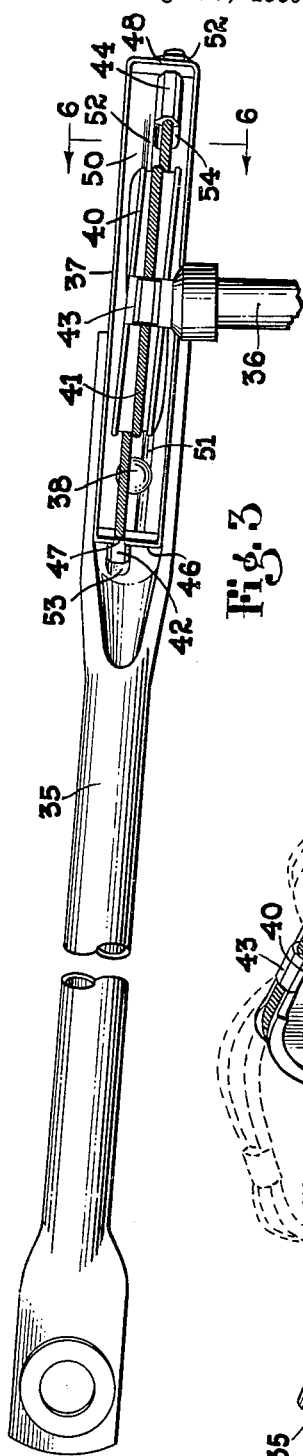
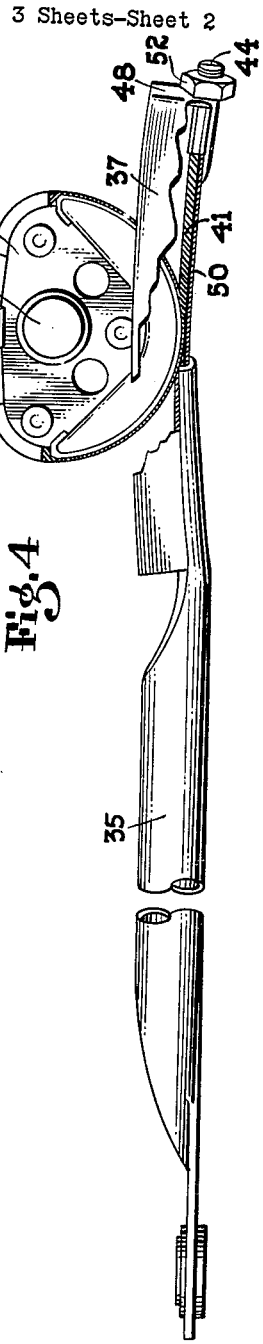
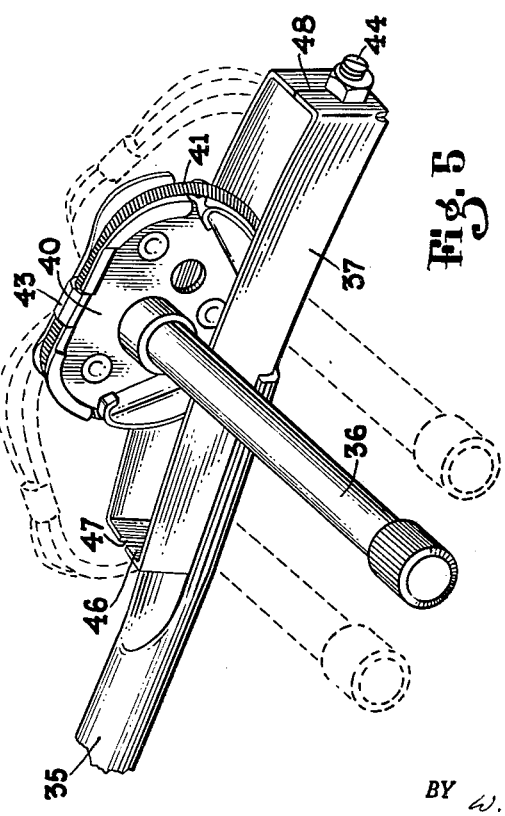
INVENTOR.
LEO J. WUBBE
BY W. E. Recktenwald
P. J. Rose
ATTORNEYS

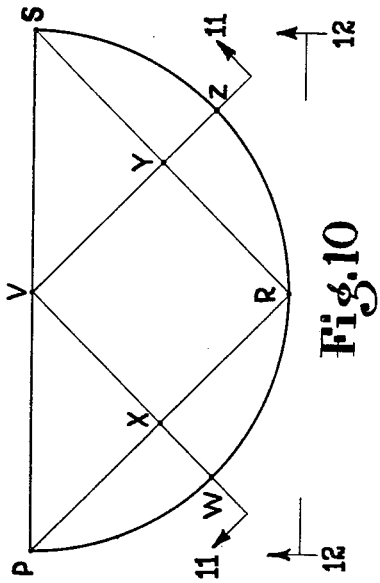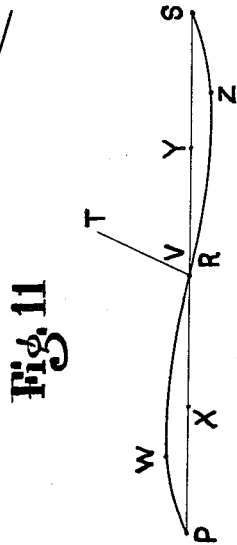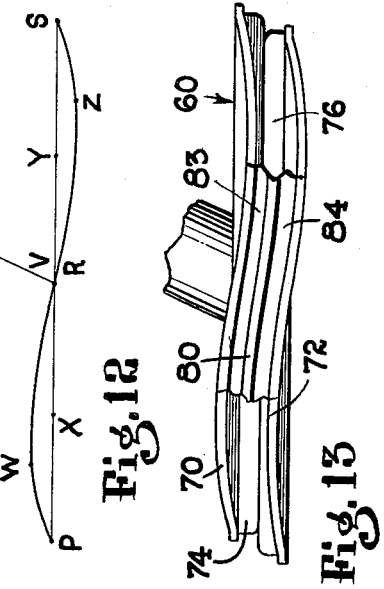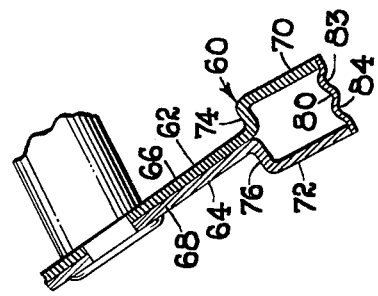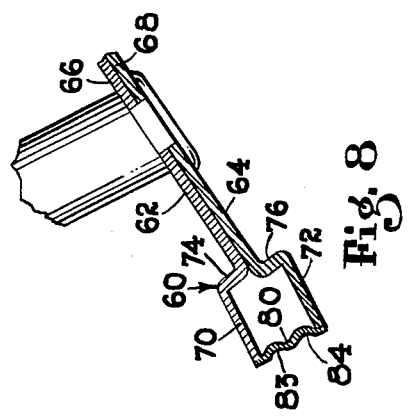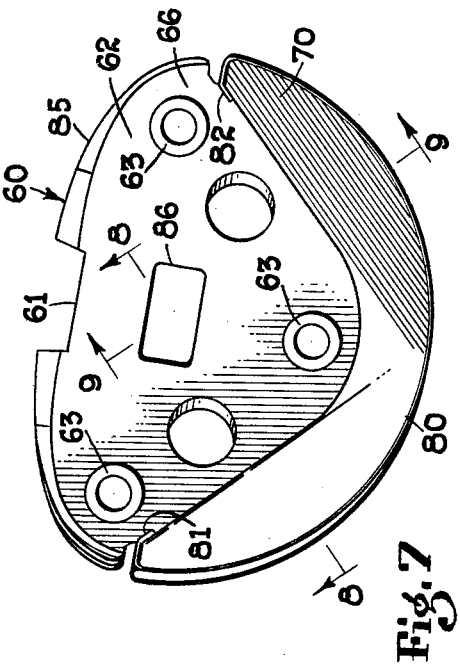

United States Patent Office 3,059,486
Patented Oct. 23, 1962

3,059,486
MOTION-TRANSMITTING DEVICE
Leo J. Wubbe, Beverly Shores, Ind., assignor to The Anderson Company, a corporation of Indiana
Filed Aug. 25, 1960, Ser. No. 51,836
18 Claims. (Cl. 74—95)

This invention relates to improvements in windshield wiper drive mechanisms, and more particularly to improvements in the drive connection between the wiper motor and the pivot shaft for oscillating the wiper arm and blade assembly. While the invention is primarily concerned with windshield wiper drive mechanisms, it is applicable to other devices wherein a reciprocating member is used to oscillate a shaft.

The disadvantages of crank-and-link drive mechanisms and of pulley drive mechanisms using long lengths of cable and numerous pulleys are discussed in U.S. Patent No. 2,901,764, issued on September 1, 1959, to John W. Anderson, who discloses the idea of using a short length of cable wrapped once around a single pulley on the shaft to be oscillated and secured at opposite ends to a driving link connected to the motor. Although this system has proven to be of great commercial significance, certain improvements and modifications on the basic teaching of said patent have been made, some of which form the basis of the present disclosure.

In my copending application, Serial No. 851,210, filed on October 22, 1959, I disclosed, among other things, the improvement of operatively connecting the pulley to the driving link by a special cable arrangement whereby the cable continually holds the link in nesting engagement with the pulley. Due to the flexing of the cable at the points of connection to the link, it became apparent that a point of potential cable failure was being created at the points of connection of the cable to the link.

The problem of preventing the short cable from wearing out too fast has been further complicated by the fact that space limitations in recent automobile designs now require the driving link to be positioned obliquely to the wiper arm pivot shaft. An attempt has been made to solve this oblique driving problem by so constructing the pulley and assembling it to the shaft that when the pulley is midway between its limiting positions of oscillation, the plane of its periphery forms the same oblique angle with the pivot shaft as does the driving link. Chafing of the cable occurred, however, due to the cocked position of the pulley on the shaft, since the grooves in the periphery of the pulley passed out of alignment with the portion of the cable on the driving link as the pulley was rotated out of its median position. To eliminate this chafing of the cable, the grooves on the pulley have been formed helically, with the helix angle being equal to the angle by which the driving link departs from a perpendicular to the wiper arm pivot shaft.

In cases where the angle between the driving link and the wiper arm pivot shaft is not constant, due to the throw of the crank of the wiper motor when the wiper motor axis is not coplanar with the axis of the wiper arm pivot shaft, the helix angle of the pulley grooves has been made equal to the average angle by which the driving link departs from a perpendicular to the wiper arm pivot shaft. The forming of the grooves helically on the pulley is expensive, however, especially when it is considered that different models of automobiles have the wiper motors located in various positions relative to the wiper arm pivot shafts, thus requiring different helix angles for the grooves on the different pulleys.

Another problem has existed in the securing of the cable to the pulley to prevent slippage of the cable thereon. A lug clamped to the cable and fitting in a slot in the pulley has been provided for this purpose, but this has formerly been done in a manner susceptible to causing failure of the cable as the pulley is oscillated through numerous cycles.

It is an object of this invention to provide improved motion-transmitting means for converting reciprocal movement of a link to oscillatory movement of a shaft.

A further object of the invention is to provide a means for reducing flexure of the cable adjacent its ends in a motion-transmitting mechanism wherein a reciprocating link oscillates a pulley by means of a cable operatively engaging with the pulley and having opposite ends secured to the link.

Another object of the invention is to provide a motion-transmitting mechanism of the class described wherein the cable is at all times and throughout its entire length restrained against movement axially of the pulley.

A still further object of the invention is to provide an improved means for limiting slippage between the cable and pulley in a motion-transmitting mechanism of the class described.

Yet another object of the invention is to provide a novel means of constructing a substantially helically grooved pulley for use in a motion-transmitting mechanism wherein a reciprocating link oscillates a shaft by means of a cable operatively engaging with the pulley which is mounted on and keyed to the shaft, the ends of the cable being fastened to said link and the link being positioned obliquely to the shaft.

Other objects and advantages of the invention will become apparent after the description hereinafter set forth is considered in conjunction with the drawings annexed hereto.

FIGURE 1 is an isometric view of the front of a windshield of an automobile and associated windshield wiper mechanism, illustrating an environment in which my invention may be used;

FIGURE 2 is a diagrammatic view illustrating the theory of the development of the pulley of my invention;

FIGURE 3 is a plan view of the motion-transmitting device of my invention;

FIGURE 4 is an elevational view of the device of FIGURE 3, with portions broken away, looking axially of the shaft;

FIGURE 5 is an isometric view of the device of FIGURES 3 and 4;

FIGURE 6 is a cross-sectional view taken along section line 6—6 of FIGURE 3;

FIGURE 7 is an elevational view of a pulley constructed in accordance with my invention;

FIGURE 8 is a partial sectional view taken along section line 8—8 of FIGURE 7, and including the end of the shaft;

FIGURE 9 is a partial sectional view taken along section line 9—9 of FIGURE 7, and including the end of the shaft;

FIGURE 10 is a diagrammatic view illustrating a step in the development of a pulley with a substantially helical groove along a semicircular periphery thereof;

FIGURE 11 is a view taken along bent section line 11—11 of FIGURE 10;

FIGURE 12 is an end view taken in the direction of arrows 12—12 of FIGURE 10; and FIGURE 13 is a view simliar to FIGURE 12, but illustrating a completed pulley.

FIGURE 1 illustrates an environment in which my invention may be used and shows a windshield 20 of an automobile, a windshield wiper motor 22 operatively connected to a pair of reciprocating links 23 and 24, a pair of generally semicircular pulleys 25 and 26 oscillated by the reicprocating links, a pair of wiper arm pivot shafts 27 and 28 mounted in bearings (not shown) and keyed to the pulleys for oscillation therewith, a pair of windshield wiper arms 29 and 30 secured to the ends of the shafts, and a pair of windshield wiper blade assemblies 31 and 32.

As pointed out heretofore, space limitations sometimes require a driving or reciprocating link to be positioned obliquely to a pivot shaft oscillated thereby. Such an arrangement is shown in FIGURE 3, which discloses a link 35, similar to links 24, 25, adapted to be operatively connected to and reciprocated by a motor such as motor 22. The link 35 is positioned obliquely to a pivot shaft 36.

The link 35 may be tubular in form with the end adjacent shaft 36 pinched together and formed into a sort of cradle to receive a curved track member 37 fastened therein in any suitable manner, such as by a pair of rivets, one rivet 38 being shown in FIGURE 3. A pulley 40, to be more fully described hereinafter, is keyed to the end of shaft 36 and cocked slightly with respect thereto so as to be generally in alignment with the obliquely positioned curved track member 37. The pulley 40 and curved track member 37 are operatively connected by a cable 41 having three lugs 42, 43 and 44 pinched securely thereon.

The curved track member 37 may be stamped from a flat blank and then formed into the desired closed channel shape. An upstanding end portion 46 thereof is slotted at 47 to receive cable 41. The other upstanding end portion 48 is apertured to receive lug 44. The curved bottom of track member 37 presents a convexly curved surface 50 to the pulley 40. The cable 41 extends from lug 42, along surface 50 and to the right in FIGURE 2, to the bottom of pulley 40, and then counterclockwise (FIGURE 4) around pulley 40, and then farther to the right along surface 50 to lug 44. The ends of cable 41 follow the curvature of surface 50, but extend generally tangentially from the pulley 40. Lug 42 is located on the outer side of end portion 46 of the track member 37 with the lug 44 extending through end portion 48 and being threaded on its outer end to receive a nut 52 which is tightened on the lug 44 to provide tension in cable 41.

The top portion of the pulley 40 is provided with a slot 45 (FIGURE 4) for receiving lug 43 in a manner preventing slipping of cable 41 on pulley 40. Slot 45 is shaped similarly to slot 61 in a pulley 60 shown in FIGURE 7, and is wedge shaped, the bottom thereof being shorter than lug 43 and the top being longer than lug 43. This permits lug 43 to seek its own level in the slot until it firmly engages the sides thereof, thus eliminating reciprocation of lug 43 in the slot with consequent shortened life of the cable 41, as could occur if the slot were rectangular and normal manufacturing tolerances were present between the lug and slot.

An important feature of the invention lies in the design of and the cooperation between the pulley 40 and convexly curved surface 50, in conjunction with the location of the lugs 42 and 44 for anchoring cable 41 to curved track member 37. This can be best understood by reference to some of the prior art constructions. For example, in some prior art constructions, lugs comparable to lugs 42 and 44 were located more or less in a plane tangent to the bottom of the pulley and the surface comparable to surface 50 was flat and spaced from the pulley in a manner allowing movement of the surface radially of the pulley and consequent flexing of the cable adjacent its ends. In an effort to prevent movement of the surface comparable to surface 50 radially of the pulley, some later designs provided a spool-shaped pulley having comparatively extensive flange portions joined by a smaller diameter portion around which the cable extended. The ends of the cable were anchored adjacent the flat surface comparable to surface 50 and the flanges of the spool-shaped pulley rode on the flat surface. The cable then extended upwardly to the smaller diameter portion of the pulley. The direction of the cable thus enabled it it exert a resultant force urging the flat surface and the pulley together. Fexing of the cable adjacent its ends still occurred, however, in the operation of the device.

In the present construction, the track member 37 is curved to present a convexly-curved surface 50 to the pulley 40, and the pulley 40 is constructed in such a manner that any contact between the pulley and surface 50 is merely incidental, since the cable 41 is carried adjacent the outermost periphery of the pulley 40 and could be said to be squeezed between the pulley and surface 50. At the same time, the lugs 42 and 44 are located below a plane tangent to the bottom of the pulley, this being made possible by the curvature provided in surface 50, and the tension in cable 41 will, therefore, urge pulley 40 and surface 50 toward each other. The net result is that when link 35 is shifted in either direction to wind cable 41 up on one side of pulley 40 and unwind it from the other side and thus rotate the pulley 40 and shaft 36 through a limited arc, the cable 41 flexes only where it is smoothly winding and unwinding from the pulley 40, there being no flexing adjacent lugs 42 and 44. At any given instant, the portion of cable 41 between the pulley and lug 42 and the portion between the pulley and lug 44 are substantially in contact with surface 50. This is important, since even though in some former constructions these end portions of the cable were flexed through only very small angles as the pulley was oscillated, the repeated flexing through great numbers of cycles caused premature failure of the cable.

It will be obvious that the curvature of track member 37 and the construction and arrangement of pulley 40 and cable 41 are equally advantageous in cases where link 35 is perpendicular to shaft 36. To prevent the ends of cable 41 from chafing against each other and thus fraying the cable and causing failure thereof, the curved track member 37 is provided with grooves 51 and 52 on the surface 50 thereof to receive the cable. Further, recesses 53 and 54 are provided, respectively, in link 35 and in surface 50 of member 37 for receiving the respective lugs 42 and 44, in order that the ends of cable 41 may be located substantially in contact with the grooves 51 and 52.

In FIGURE 5, an attempt has been made to show by dotted lines the relative position of the pulley and shaft with respect to curved track member 37 at the limits of the stroke of link 35 and member 37. For convenience of illustration and ease of understanding, the pulley and shaft have been moved to the dotted-line positions, it being understood that in actual operation the shaft and pulley ocsillate about a fixed axis as the link 35 reciprocates.

The pulley 40 is specially constructed in accordance with the invention when the link 35 and shaft 36 are positioned obliquely. For a discussion of the theory involved, reference may be had first to FIGURE 2, wherein the rectangle ABCD represents a cylinder having one complete turn of a helix inscribed thereon as represented by curved line EFGH. The diameter of the cylinder is determined by the desired size of pulley, and the lead angle of the helix is determined by the angular displacement of link 35 from a position perpendicular to shaft 36. Since the pulley 40 is intended to be oscillated through less than 180 degrees, it is not necessary to use a pulley as large as cylinder ABCD. It is sufficient to use merely enough of cylinder ABCD to include the one-half turn of the helix represented by curved line FG. Further economy can then be effected by forming the pulley so that its faces are positioned obliquely to the shaft while its circumferential surface is maintained parallel to the shaft. For example, it can be imagined in FIGURE 2 that cylinder ABCD is chopped away along line JK and along line LM, leaving a pulley JKLM, having a one-half turn FG of a helix thereon, located obliquely to a shaft 36′.

It will be noted that horizontal elements of the surface of pulley JKLM are elements of a true cylindrical surface parallel to the axis of shaft 36', and that curved line FG is part of a true helix, representative of a groove on the pulley.

As pointed out hereinbefore, forming of a groove helically on the pulley eliminates chafing between the cable and the groove as the pulley is oscillated. However, the forming of a groove which is a true helix is an expensive procedure, and I have developed an inexpensive method of forming pulleys with grooves thereon which very closely approximate a true helix, or more specifically grooves which very closely approximate one half of a turn of a true helix, such as curved line FG. For an explanation of this method, reference should be made to FIGURES 10 to 13.

The item in FIGURES 10 to 12 may be considered to have originally been a thin, flat, semicircular metal plate. The plate has been modified by the bending of a ninety-degree arcuate edge portion upwardly along chord PR and by the bending of the other ninety-degree arcuate edge portion downwardly along chord RS. This can be seen in FIGURE 11, it being remembered that section line 11—11 of FIGURE 10 is bent through ninety degrees as shown. Looking in the direction of arrows 12—12 of FIGURE 10, the modified plate appears as shown in FIGURE 12. It will be noted that semicircular edge PWRZS of FIGURE 10 appears in FIGURE 12 as a curved line PWRZS which is in the shape of a slightly curved backward S. It has been found that the line PWRZS of FIGURE 12 deviates only a very small amount from a true helical line such as curved line FG of FIGURE 2, the axis of the very nearly true helix being through point V of FIGURE 10, but inclined toward point S from a perpendicular through point V, as line VT in FIGURE 12.

FIGURES 7, 8, 9 and 13 illustrate a pulley 60 constructed in accordance with the development above described. The pulley 60 is formed of two identically shaped halves 62 and 64, which are reversed or inverted relative to each other, and also laterally offset slightly from each other for reasons set forth hereinafter, as can be noted best in FIGURE 13. Each pulley half has a web section designated by numeral 66 on pulley half 62 and by numeral 68 on pulley half 64. These web sections are fastened together in any suitable manner, as by rivets 63 shown in FIGURE 7. Semicircular edge portions 70 and 72 are provided, respectively, on pulley halves 62 and 64 and are joined to the respective web sections 66 and 68 by a pair of offsetting portions 74 and 76, the shape of which can be understood from a view of FIGURE 7, particularly with respect to the line dividing web section 66 from edge portion 70. The semicircular edge portions 70 and 72 are bent in accordance with the manner described with relation to the thin metal plate of FIGURES 10–12. Thus, edge portion 70, for example, has the left hand ninety-degree part thereof bent upwardly, as can be noted in FIGURES 8 and 13, and the right hand ninety-degree part thereof bent downwardly, as can be noted in FIGURES 9 and 13. Edge portion 72 of pulley half 64 is similarly so formed before being inverted with respect to pulley half 62 and secured thereto. As can be noted in FIGURE 13, the peripheral edges of edge portions 70 and 72 take on the shape of the very nearly true helical line PWRZS of FIGURE 12.

A thin strip 80, which may be made of metal, is wrapped around the periphery of edge portions 70 and 72 and secured thereto by bent-over tangs, such as tangs 81 and 82, bent into engagement with offsetting portions 74 and 76 on opposite sides of web sections 66 and 68. The strip 80 is provided with a pair of grooves 83 and 84 for the reception of a cable such as cable 41. It has been found that the strip 80 and the grooves 83 and 84 therein take on the shape of the peripheries of edge portions 70 and 72, so that the grooves conform to the very nearly true helical line PWRZS of FIGURE 12, while the offsetting of pulley halves 62 and 64 serves to render the strip 80 generally a part of a true cylindrical surface parallel to the shaft on which the pulley is to be mounted, as explained with respect to the surface of pulley JKLM in FIGURE 2, resulting in better cooperation between the pulley and the link.

Opposite the edge portions 70 and 72 of pulley 60, web sections 66 and 68 are provided with flanges, such as flange 85 on web section 66 in FIGURE 7. These flanges may be pinched together to form a trough for receiving a cable, as can be best seen in FIGURES 5 and 6 on pulley 40, which is formed in the same manner as pulley 60. The flanges are provided with a wedge-shaped slot 61 for receiving a lug on a cable, as previously explained with reference to pulley 40.

Any suitable method may be used to secure the pulleys to the shafts. For example, a square hole may be provided, such as hole 86 in pulley 60, and the shaft may be provided with a suitable noncircular end portion to key the pulley and shaft together. The pulley may then be welded on the shaft, or the ends of the shaft may be peened over as in FIGURES 8 and 9, or other suitable fastening means may be provided to secure the pulley axially of the shaft.

It will be seen that I have provided an improved motion-transmitting means for converting reciprocal movement of a link to oscillatory movement of a shaft. Further, it will be seen that I have provided such a motion-transmitting means which is particularly useful in applications where the link is positioned obliquely to the shaft.

It will also be seen that I have provided a novel method of constructing a pulley having substantially helical grooves thereon for use in such a motion-transmitting device, and that I have provided an improved means for anchoring a cable to a pulley in such a motion-transmitting device.

Having thus described my invention, it is obvious that various modifications may be made in the same without departing from the spirit of the invention; and, therefore, I do not wish to be understood as limiting myself to the exact form, construction, arrangement, and combination of parts herein shown and described.

I claim:

1. A motion-transmitting mechanism comprising a shaft mounted for oscillatory movement, a pulley secured to said shaft for oscillation therewith, a reciprocable link generally tangent to said pulley, and a flexible tension member wrapped around said pulley and extending substantially tangentially therefrom in generally opposite directions and having its ends secured to said link, said link being formed between the ends of said flexible tension member to present a convexly curved surface to said pulley and said ends of said flexible tension member being secured to said link in a manner preventing displacement of said convexly curved surface radially of said pulley at the points of tangency of said flexible tension member therewith, said pulley being formed to accommodate engagement of said flexible tension member with said convexly curved surface at the points of tangency of said flexible tension member with said pulley whereby the only flexing of said flexible tension member occurs at the points of tangency of said flexible tension member with said pulley as said link is reciprocated to oscillate said pulley and shaft.

2. A motion-transmitting mechanism as claimed in claim 1, wherein grooves are provided on said pulley and on said convexly curved surface of said link and said flexible tension member is always in said grooves, any portion thereof leaving a groove on said pulley as said pulley is oscillated immediately engaging a groove on said convexly curved surface, and any portion thereof leaving a groove on said convexly curved surface as said pulley is oscillated immediately engaging a groove on said pulley.

3. A motion-transmitting mechanism comprising a shaft mounted for oscillatory movement, a pulley secured to said shaft for oscillation therewith, a reciprocable link generally tangent to said pulley, a curved track member secured to said link adjacent said pulley and presenting a convexly curved surface to the periphery of said pulley, and a cable wrapped under tension around said pulley and extending substantially tangentially therefrom in generally opposite directions, the ends of said cable being secured to opposite ends of said curved track member in a relation to said convexly curved surface whereby the tension in said cable urges said pulley and said convexly curved surface toward each other, and said pulley being formed to accommodate engagement of said cable with said convexly curved surface at the points of tangency of said cable with said pulley whereby during reciprocation of said link and curved track member and oscillation of said pulley and shaft any portion of said cable not engaging said pulley at a given instant is in engagement with said convexly curved surface.

4. A motion-transmitting mechanism as claimed in claim 3, wherein grooves are provided on said pulley and on said curved track member for receiving said cable.

5. A motion-transmitting mechanism as claimed in claim 3, wherein lugs are provided adjacent opposite ends of said cable and said curved track member has a pair of upstanding end portions, the cable extending through said end portions and the lugs cooperating with said end portions to maintain said cable under tension, one lug abutting the outside of an end portion and the other lug extending through the other end portion and being threaded and provided with a nut on its outer end to adjust the tension of said cable.

6. A pulley adapted to be oscillated by a cable for oscillating a shaft keyed thereto, said pulley comprising two generally semicircular halves secured together, each half having an offset portion extending along the substantially semicircular periphery, each offset portion having one substantially quarter-circular part bent in one direction and the other substantially quarter-circular part bent through an equal angle in the other direction, and a grooved strip secured to said pulley halves along the bent offset peripheral portions thereof and conforming thereto to present a substantially helical groove on the periphery of said pulley.

7. A pulley as claimed in claim 6, wherein the pulley halves are laterally offset in an amount to render the surface presented by the grooved strip substantially a true cylindrical surface with a substantially helical groove thereon.

8. A pulley as claimed in claim 6, wherein the portions of the pulley halves opposite the semicircular peripheries are provided with aligned wedge-shaped slots for receiving a lug secured to a cable, the top of the slots being longer than the length of said lug and the bottom of the slots being shorter than the length of said lug, whereby the lug will seek its own level in the slots and secure the cable circumferentially of the pulley.

9. An operative connection between a reciprocable link and a shaft positioned obliquely thereto and oscillated thereby, said operative connection comprising a helically grooved pulley secured to said shaft for oscillation therewith, a convexly curved surface on said link presented to said pulley, and a flexible tension member wrapped under tension around said pulley in association with the helical grooves thereon and extending substantially tangentially therefrom in generally opposite directions and having its ends secured to said link in a relation to said convexly curved surface whereby the tension therein urges said pulley and convexly curved surface toward each other, said pulley being formed to accommodate substantial engagement of said flexible tension member with said convexly curved surface at the points of tangency of said flexible tension member with said pulley.

10. An operative connection between a reciprocable link and a shaft positioned obliquely thereto and oscillated thereby, said operative connection comprising a pulley secured to said shaft for oscillation therewith, a convexly curved surface on said link presented to said pulley, and a flexible tension member wrapped around said pulley and extending substantially tangentially therefrom in generally opposite directions and having its ends secured to said link in a manner preventing displacement of said convexly curved surface radially of said pulley at the points of tangency of said flexible tension member therewith, said pulley having substantially helical grooves thereon for receiving said flexible tension member and being formed of two generally semicircular halves having web sections secured together and having substantially semicircular edge portions offset from said web sections, said semicircular edge portions being bent to form the peripheral edges thereof substantially helically, and a grooved strip secured to said pulley halves along the peripheral edges of said semicircular edge portions and conforming thereto to shape said grooves substantially helically.

11. An operative connection as claimed in claim 10, wherein the two halves of said pulley are offset laterally from each other in an amount to render the surface presented by the grooved strip substantially a true cylindrical surface parallel to the axis of said shaft.

12. In a motion-transmitting mechanism comprising a shaft mounted for oscillatory movement, a pulley operatively connected to said shaft for oscillation therewith, a link reciprocably driven by a power source, and flexible means operatively engaging with the periphery of said pulley and said link and having its ends secured to said link, said link having a convexly curved portion juxtaposed with respect to said pulley, the ends of said flexible means being connected to the opposite extremities of said convex portion, said flexible means passing smoothly from said convexly curved portion to said pulley whereby reciprocation of said link oscillates said shaft and pulley.

13. A motion-transmitting mechanism comprising: a shaft mounted for oscillatory movement, a pulley operatively connected to said shaft for oscillation therewith, said pulley having a helically disposed peripheral portion, a link adapted to be reciprocably driven by a power source, said link having a convexly curved portion juxtaposed with respect to said pulley periphery, and flexible means operatively engaging the periphery of said pulley and having its ends connected to opposite extremities of said convex portion, said flexible means passing smoothly from said convexly curved portion to said pulley periphery whereby reciprocation of said link oscillates said shaft and pulley.

14. The structure of claim 13 wherein the flexible means is wrapped around the helically disposed portion of the pulley and has its ends extending substantially tangentially therefrom in generally opposite directions for connection to the link.

15. The structure of claim 14 wherein a portion of the flexible means intermediate its ends is contiguously disposed with the convexly curved portion.

16. The structure of claim 15 wherein the flexible means passes tangentially between the peripheral portion and the convexly curved portion.

17. A motion-transmitting mechanism comprising: a shaft mounted for oscillatory movement, a pulley operatively connected to said shaft for oscillation therewith, a link adapted to be reciprocably driven by a power source, said link having a convexly curved portion juxtaposed with respect to said pulley, and flexible means operatively engaging with the periphery of said pulley and said link, the ends of said flexible means being connected to the opposite extremities of said convex portion and having intermediate portions in operative contact with the convexly curved portion, said flexible means passing smoothly from said link to said pulley whereby reciprocation of said link oscillates said shaft and pulley.

18. The structure of claim 17 wherein the flexible means passes tangentially from the pulley and convexly curved portion.

References Cited in the file of this patent

UNITED STATES PATENTS

| | | |
|---|---|---|
| 2,027,275 | Foster | Jan. 7, 1936 |
| 2,225,845 | Richolt | Dec. 24, 1940 |
| 2,660,894 | McCelland | Dec. 1, 1953 |
| 2,730,795 | Bloss | Jan. 17, 1956 |
| 2,869,223 | Killian et al. | Jan. 20, 1959 |
| 2,901,764 | Anderson | Sept. 1, 1959 |
| 2,947,185 | Ziegler | Aug. 2, 1960 |
| 2,951,460 | Pierson | Sept. 6, 1960 |

FOREIGN PATENTS

| | | |
|---|---|---|
| 647,006 | France | Nov. 19, 1928 |
| 678,338 | France | Mar. 21, 1930 |
| 741,166 | Great Britain | Nov. 30, 1955 |